(12) United States Patent
Huang et al.

(10) Patent No.: US 8,374,514 B2
(45) Date of Patent: Feb. 12, 2013

(54) PARALLEL DIGITAL COHERENT DETECTION USING SYMMETRICAL OPTICAL INTERLEAVER AND DIRECT OPTICAL DOWN CONVERSION

(75) Inventors: Yue-Kai Huang, Plainsboro, NJ (US);
Ting Wang, West Windsor, NJ (US);
Dayou Qian, Princeton, NJ (US);
Robert Saperstein, LaJolla, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 206 days.

(21) Appl. No.: 12/760,813

(22) Filed: Apr. 15, 2010

(65) Prior Publication Data

US 2010/0266282 A1  Oct. 21, 2010

Related U.S. Application Data

(60) Provisional application No. 61/169,361, filed on Apr. 15, 2009.

(51) Int. Cl.
*H04B 10/00* (2006.01)
*H04B 10/06* (2006.01)
(52) U.S. Cl. ......... 398/208; 398/203; 398/204; 398/163
(58) Field of Classification Search ............... 398/65, 398/152, 183–186, 202–204, 208, 163
See application file for complete search history.

(56) References Cited

U.S. PATENT DOCUMENTS

| 7,860,406 B2 * | 12/2010 | Xie ............................... 398/205 |
| 8,111,993 B2 * | 2/2012 | Lowery et al. ................... 398/81 |
| 2002/0030877 A1 * | 3/2002 | Way et al. ...................... 359/183 |
| 2006/0228118 A1 * | 10/2006 | Schemmann et al. ......... 398/184 |

* cited by examiner

*Primary Examiner* — Dalzid Singh
(74) *Attorney, Agent, or Firm* — Joseph Kolodka

(57) ABSTRACT

A method includes modulating lightwaves to provide first and second OFDM signal sidebands at a first polarization direction and first and second OFDM signal sidebands at a second polarization direction, and combining sidebands that are oppositely positioned and joined from the first and second OFDM signal sidebands at each polarization direction to provide a polarization multiplexing OFDM signal.

6 Claims, 1 Drawing Sheet

PARALLEL DIGITAL COHERENT DETECTION USING SYMMETRICAL OPTICAL INTERLEAVER AND DIRECT OPTICAL DOWN CONVERSION

This application claims the benefit of U.S. Provisional Application No. 61/169,361, entitled "Parallel Digital Coherent Detection Using Symmetrical Optical Interleaver And Direct Optical Down Conversion", filed on Apr. 15, 2010, the contents of which is incorporated by reference herein.

BACKGROUND OF THE INVENTION

In high-capacity, long-haul fiber data transmission, digital signal processing (DSP) after signal detection can greatly improve transmission performance by providing compensation against fiber impairments such as chromatic dispersion (CD) and polarization mode dispersion (PMD). Together with polarization diversity coherent detection, DSP also grants polarization division multiplexing (PDM) to double the transmitted data rate. To implement DSP for post detection processing, analog-to-digital converters (ADCs) at high sampling rate are needed in the coherent receiver design. In reality, the signal bandwidth that can be supported by electronic ADC is much lower than the E-O modulator bandwidth at the transmitter. Currently, the state of the art is about 20 GHz for electronic ADC bandwidth, while 40 GHz bandwidth E-O modulators are already commercially available. To fully utilize the potential of post-detection DSP at high data rates, a new ADC technology is required to fill the bandwidth gap.

Parallel processing of incoming high BW signals is often used to achieve high ADC sampling rates. Electronic time-interleaved ADCs have synchronized track-and-hold circuitry, which has to cover the entire input signal BW (state of the art ~20 GHz), on each parallel sampling path. Parallel processing in frequency domain, which can reduce the BW requirement of each sampling path, has been proposed to reach higher sampling rates. We proposed recently a photonic filter bank (PFB) structure using orthogonal filter design to allow digital perfect reconstruction in theory. In order to sample the high frequency tributary of the incoming signal, filter bank methods need RF electronic frequency down converters. The need for rf down conversion not only increases system complexity and cost (a typical phase/polarization diversity receiver requires a total of four converters), but it may also degrade system performance because of the difficulty of analog wideband processing in electronic domain. In terms of filter design, it is desirable to have sharp filter roll-offs because of the limited ADC BW in each parallel sampling paths. In PFB structure, sharp roll-offs are challenging to implement using orthogonal filter design because many optical taps are required.

Accordingly, there is need for a method to generate over 100 Gbit/s OFDM signals with the limited bandwidth for A/D and D/A converter tolerance.

SUMMARY OF THE INVENTION

In accordance with the invention, a method includes modulating lightwaves to provide first and second OFDM signal sidebands at a first polarization direction and first and second OFDM signal sidebands at a second polarization direction, and combining sidebands that are oppositely positioned and joined from the first and second OFDM signal sidebands at each polarization direction to provide a polarization multiplexing OFDM signal.

In another aspect of the invention, an apparatus includes a modulator for varying lightwaves to provide first and second OFDM signal sidebands at a first polarization direction and first and second OFDM signal sidebands at a second polarization direction; and a polarization beam combiner for combining sidebands that are oppositely positioned and joined from the first and second OFDM signal sidebands at each polarization direction to provide a polarization multiplexing OFDM signal.

BRIEF DESCRIPTION OF DRAWINGS

These and other advantages of the invention will be apparent to those of ordinary skill in the art by reference to the following detailed description and the accompanying figures.

DETAILED DESCRIPTION

The invention is directed to an inventive PFB architecture that uses an optical interleaver as a two-way filter bank. The optical interleaver exhibits a symmetrical spectral response about the optical carrier frequency, which will automatically translate the two filtered optical signal to low-frequency and high-frequency tributaries after O-E conversion. Optical interleavers can be easily designed to have very sharp roll-offs so that the filtered tributaries will fit into the sampling BW of electronic ADC. Another aspect of the PFB architecture is a direct optical down conversion scheme, which uses two synchronized optical local oscillators (LO) during coherent detection located with respect to the high-frequency tributary in such a way that RF down converters are no longer required. With this new invention, we can nearly double the supported signal BW for digital coherent detection.

Figure 1:
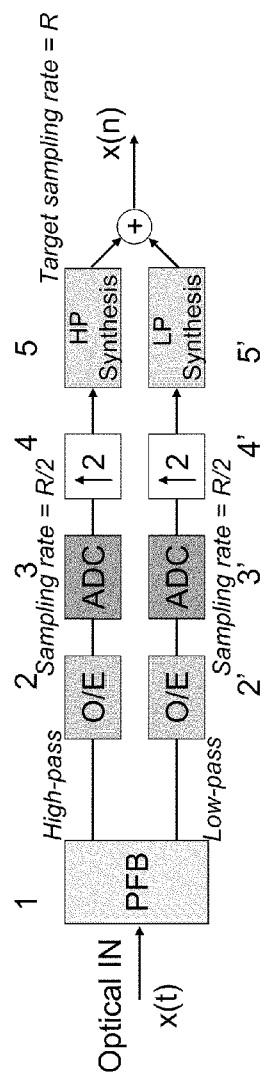
FIG. 1 is a diagram illustrating a PFB architecture with two parallel ADC sampling paths, in accordance with the invention

The diagram of FIG. 1 illustrates a PFB-assisted digital coherent detection scheme with two parallel ADC sampling paths, in accordance with the invention. The incoming optical signal, which can be any modulation format that can be detected using a coherent receiver, is to be sampled at a targeted rate of R, higher than the Nyquist rate, for post-detection DSP. A PFB (1) first slices the optical signal into a low-frequency tributary and a high-frequency tributary so the BW of each tributary is less than or equal to the sampling BW of the ADC (3, 3').

The O/E photo-detection for the low-frequency tributary will be of a conventional optical coherent detector (2'), while for the high-frequency part a new coherent detection scheme is used to perform direct optical down conversion (2). Then both paths are sampled and converted to digital signals by ADCs at rate R/2 (3, 3'). After sampling, the two digital signals are first up-sampled to rate R by interleaving zeroes between sampling values (4, 4'). Two digital FIR synthesis filters (5, 5'), their filter responses directly calculated from the PFB high-pass and low-pass responses, are then applied to digitally reconstruct the original signal at rate R. The length of FIR synthesis filters is a trade-off problem as longer filter lengths create less signal distortion and aliasing but will require more DSP computation power. The rule of thumb is to design the shortest filter length which can fulfill the aliasing level requirement, typically less than half of the desired ADC resolution depending on the effective number of bits (ENOB).

The length of FIR synthesis filters is a trade-off problem as longer filter lengths create less signal distortion and aliasing but will require more DSP computation power. The rule of thumb is to design the shortest filter length which can fulfill the aliasing level requirement, typically less than half of the desired ADC resolution depending on the effective number of bits (ENOB).

Figure 2:
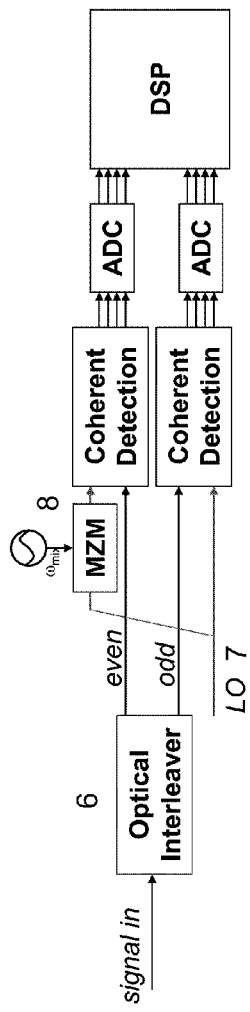
FIG. 2 is a diagram illustrating details of the front end of the digital coherent scheme, in accordance with the invention.
Figure 3:
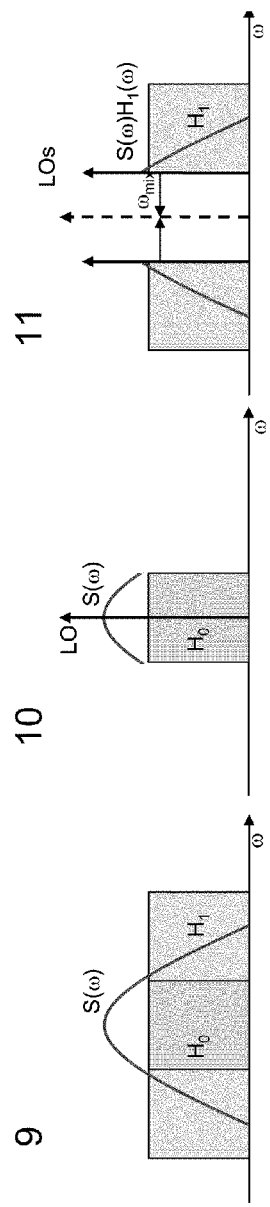
FIG. 3 is a diagram of transformations of an optical signal by the PFB architecture, in accordance with the invention.

The diagram of FIG. 2 illustrates details of a front end of the digital coherent coherent scheme, in accordance with the invention. The diagram of FIG. 3 depicts transformations of an optical signal by the PFB architecture, in accordance with the invention.

An optical interleaver (6) is used as a split-two PFB for the input signal $S(\omega)$. By lining up the center of the interleaver's odd channel to the optical carrier frequency (9), the filtered odd and even channel outputs will properly translate to low-pass and high-pass filtering after converting to electronic baseband signals because of the symmetry property of the optical interleaver. For the low frequency path, only one optical LO is used for coherent detection (7, 10), and up to four electronic outputs will be generated depending on whether phase-diversity and/or polarization-diversity are used. On the high frequency path, two optical LOs will be generated by driving a Mach-Zehnder modulator (MZM) with an rf tone, $\omega_{mix}$ (8). This scheme allows simultaneous down-conversion of the high-frequency signal to the low-frequency band during coherent OE detection so the output signals can be within the ADC sampling BW (11).

From the above, the advantages of the present invention can be readily appreciated. By parallel processing the incoming signal in two spectral tributaries, the invention technique can nearly double the supported signal BW using the same electronic ADC sampling BW. The present invention allows the implementation of high speed data transmission with post-detection DSP where the channel BW is higher than individual electronic ADC BW. The direct optical down conversion eliminates the need for multiple rf electronic down converters, reducing design complexity and cost. The optical interleaver can be designed to have shaper roll-offs at a much lower cost compare to the previous orthogonal filter design. The PFB structure provides demultiplexing of high BW signal directly in optical domain, relaxing the BW requirements for photodetectors and electronics in the coherent receiver.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. A method comprising the steps of:
    dividing an optical signal bandwidth BW into smaller portions for parallel analog-to-digital converter ADC processing, said optical signal having a bandwidth greater than that of said ADC;
    creating a low frequency path from said smaller portions for coherent detection with one optical local oscillator;
    creating a high frequency path from said smaller portions for coherent detection with direct optical down-conversion; and
    determining digital synthesis finite impulse response FIR filters from a photonic filter bank filter response responsive to a parallel ADC sampling of outputs from said low frequency and high frequency paths.

2. The method of claim 1, wherein said step of dividing comprises a symmetrical spectral response allowing direct translation to an electronic baseband operation.

3. The method of claim 1, wherein said step of dividing comprises a sharp roll-off response requiring less bandwidth for each individual said ADC.

4. The method of claim 1, wherein said step of creating a high frequency path comprises driving a Mach-Zender modulator with a radio frequency tone to generate two optical local oscillators.

5. The method of claim 1, wherein said step of creating a high frequency path comprises electronic outputs already in a low-frequency band which fit within a sampling bandwidth of said ADC.

6. The method of claim 1, wherein said step of determining digital synthesis FIR filters comprises FIR lengths responsive to signaling aliasing and computation power.

* * * * *